D. J. ELLIOTT & W. W. REILLY.
LOCKING DEVICE FOR AUTOMOBILE STEERING WHEELS.
APPLICATION FILED JUNE 28, 1910.
972,605.
Patented Oct. 11, 1910.
2 SHEETS—SHEET 1.
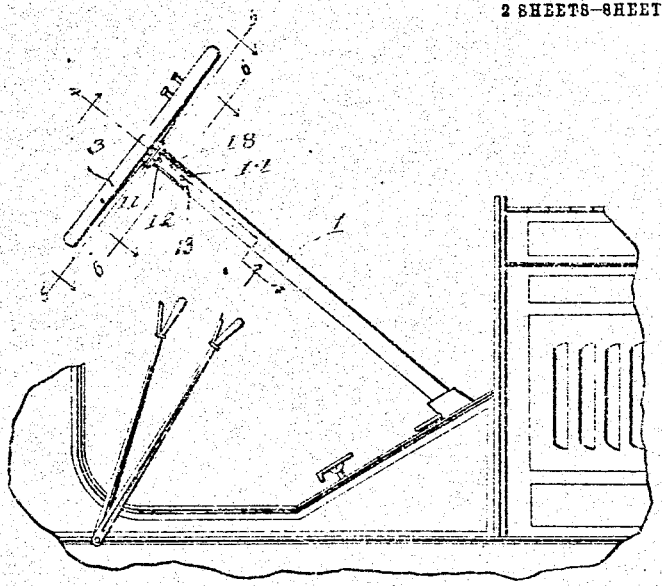
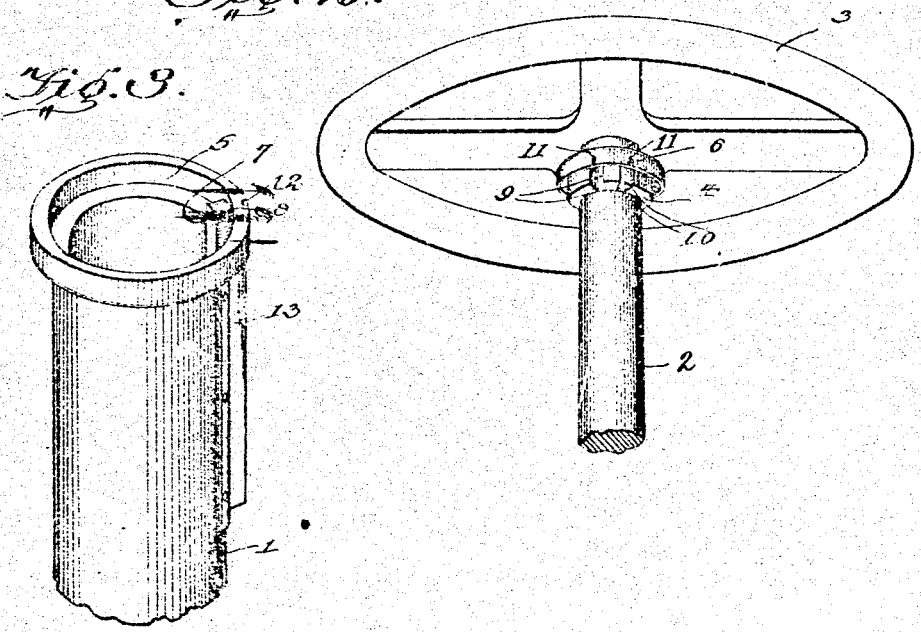
Witnesses
Frederick L Fox
C Bradway
Inventors
David J. Elliott and
William W. Reilly.
By Victor J. Evans
Attorney

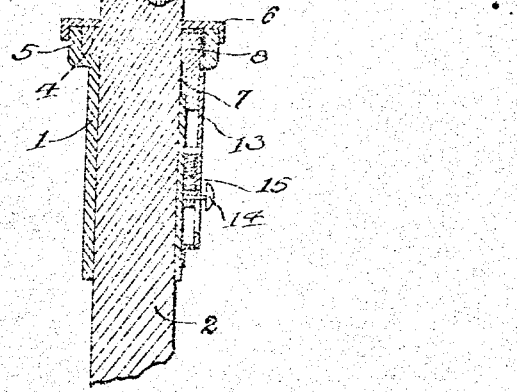
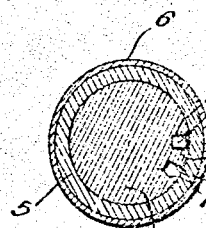
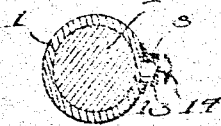
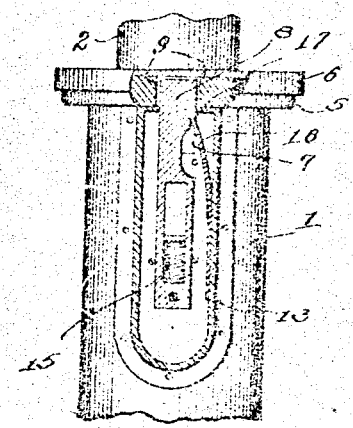

UNITED STATES PATENT OFFICE.

DAVID J. ELLIOTT AND WILLIAM W. REILLY, OF MONTE VISTA, COLORADO.

LOCKING DEVICE FOR AUTOMOBILE STEERING-WHEELS.

972,605.  Specification of Letters Patent.  Patented Oct. 11, 1910.

Application filed June 28, 1910. Serial No. 569,348.

*To all whom it may concern:*

Be it known that we, DAVID J. ELLIOTT and WILLIAM W. REILLY, citizens of the United States, residing at Monte Vista, in the State of Colorado, have invented new and useful Improvements in Locking Devices for Automobile Steering-Wheels, of which the following is a specification.

This invention relates to locking devices for automobile steering wheels, so that when the chauffeur or owner leaves his automobile, he can lock it so as to prevent any unauthorized person from using it.

The invention has for one of its objects to provide an extremely simple, practical and effective locking device which can be readily locked when the occupant of the car wishes to render it inoperative, the lock being released by the insertion of a key.

Another object of the invention is the provision of a locking pawl or bolt on the steering column which engages parts of the steering or wheel shaft so as to lock the front wheels while they are tilted either to the right or left against the curb of the street.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of a steering column for an automobile equipped with the improved locking device. Fig. 2 is a bottom perspective view of the upper portion of the steering shaft. Fig. 3 is a perspective view of the upper portion of the column. Fig. 4 is a vertical transverse section on line 4—4, Fig. 1. Figs. 5 and 6 are sectional views on lines 5—5 and 6—6, respectively, of Fig. 1. Fig. 7 is a detail sectional view of the lock.

Similar reference characters are employed to designate corresponding parts throughout the views.

Referring to the drawings, 1 designates the tubular steering post or column of an automobile on which is rotatably mounted the steering shaft 2 that may be provided with a wheel 3 or an ordinary steering lever. The shaft 2 is provided at a point immediately below the wheel 3 with an annular flange or shoulder which sets into the upper end of the column, said upper end being enlarged at 5 to receive the annular flange 4 on the steering shaft. On the shaft is a dust collar or ring 6 that covers the upper end of the column, and on the ring is a peripheral depending flange or rim that fits around the enlarged end of the column. In one side of the column is a recess 7 which opens into the bore of the column, and disposed in this recess is a longitudinally-movable locking bolt 8. This bolt is adapted to enter between two sets of shoulders or walls 9 and 10 formed by recessing the annular flange on the steering shaft. These recesses are so disposed that when the bolt enters either one, the front wheels of the vehicle will be turned to the right or left so as to lock against the curb of the street. To facilitate the movement of the steering shaft so as to bring either recess in alinement with the bolt, the dust cap or ring is provided with marks 11 opposite the recesses in the annular flange so that by bringing either mark opposite a mark or index 12 of the post, the bolt will be opposite the desired recess. This bolt is slidable in a casing 13 fastened to the outside of the post and the lower end of the bolt has a finger piece or knob 14 whereby the bolt can be raised to locking position. Normally, the bolt is held unlocked by a spring 15 so that it is necessary to push the knob 14 upwardly against the tension of the spring when the bolt is to be locked. When the bolt is pressed upwardly, a spring catch 16 in the casing 13 engages a shoulder 17 on the bolt and thus holds the bolt in locking position. This spring catch is released by a key that is insertible through an opening 18 in the casing 13, and by turning the key, the spring catch will be pressed to one side to allow the locking bolt to be retracted or unlocked by its spring.

From the foregoing description, taken in connection with the accompanying drawings, the advantages of the construction and method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention, what we claim as new, is:—

1. A steering device for vehicles comprising relatively-rotatable elements, one of the elements having spaced recesses, a bolt mounted to move longitudinally of the other element and to enter either of the said recesses, a spring for holding the bolt released, means for moving the bolt to locking position, an automatic device for holding the bolt in locked position, and a key for releasing the said device from the bolt.

2. The combination of a steering column, a rotatable shaft mounted therein, means for turning the shaft, a flange arranged on the shaft and set into the column, said flange having recesses, a bolt mounted on the column and arranged to enter the said recesses, and a key-released leaf spring in the column disposed alongside of the bolt to form locking means for the latter.

3. The combination of a steering column having an enlarged upper end, a shaft provided with an annular flange housed in the upper end of the column, a dust ring fastened to the shaft and covering the upper end of the column, a locking bolt mounted on the column and arranged to engage the said flange to prevent turning of the shaft, means for normally holding the bolt in unlocked position, and a key-released catch adapted to set automatically when the bolt is moved to locking position.

4. The combination of a steering column, a shaft mounted therein, a locking bolt mounted on one of the said parts, means on the other part with which the bolt engages, a casing in which the bolt is housed, a knob connected with the bolt and extending out of the casing, means for normally holding the bolt in unlocked position, and means for automatically engaging the bolt when moved to locked position for holding the same, said casing having an opening for receiving a key to release the last-mentioned means.

In testimony whereof we affix our signatures in presence of two witnesses.

DAVID J. ELLIOTT.
WILLIAM W. REILLY.

Witnesses:
  Oscar E. Linderholm,
  Alfred H. Gaedy.